United States Patent [19]

Rahimzad

[11] Patent Number: 4,637,019

[45] Date of Patent: Jan. 13, 1987

[54] DIAGNOSTIC METHOD FOR ADDRESSING ARRANGEMENT VERIFICATION

[75] Inventor: Antonio Rahimzad, Glendale, Ariz.

[73] Assignee: GTE Communication Systems Corporation, Phoenix, Ariz.

[21] Appl. No.: 661,010

[22] Filed: Oct. 15, 1984

[51] Int. Cl.[4] ............................................. G06F 11/00
[52] U.S. Cl. ........................................ 371/16; 371/20
[58] Field of Search ...................... 371/15, 16, 20, 22, 371/25; 324/73 R, 73 AT; 364/200

[56] References Cited

U.S. PATENT DOCUMENTS

| | | | |
|---|---|---|---|
| 4,025,906 | 5/1972 | Riikonen | 364/200 |
| 4,339,801 | 7/1982 | Hosaka | 371/20 |
| 4,398,299 | 8/1983 | Darling | 371/15 |
| 4,475,195 | 10/1984 | Carey | 371/16 |

Primary Examiner—Jerry Smith
Assistant Examiner—Robert W. Beausoliel, Jr.
Attorney, Agent, or Firm—Frank J. Bogacz; Peter Xiarhos

[57] ABSTRACT

This disclosure teaches a diagnostic method for finding faults in a unique addressing scheme. A telecommunications system controls external devices by operating control and sense point printed wiring cards. These printed wiring cards are organized to operate when selected by a processor. Two address components select the identity of a particular printed wiring card of a number of printed wiring cards to be operated. This invention detects any addressing apparatus which is permanently inactive, stuck to zero. This method operates continuously to build a table of faulty equipment indications.

12 Claims, 4 Drawing Figures

DIAGNOSTIC METHOD FOR ADDRESSING ARRANGEMENT VERIFICATION

BACKGROUND OF THE INVENTION

The present invention pertains to a method of verification of a decoding and enabling arrangement and more particularly to a method for diagnosing a unique addressing arrangement.

Modern microprocessors are applied to a number of real time applications which involve the controlling and sensing of external devices. These microprocessors need to control a number of distinct events. Control points and sense points provide this function of interfacing microprocessor to such real time tasks as telecommunication systems. Since telecommunications systems provide their services for many thousands of people, great numbers of sense points and control points are required for the microprocessors to perform these switching operations.

These control points and sense points must be grouped into manufacturable entities, with which a microprocessor may communicate. The microprocessor must have a scheme which allows for the manipulation of these sense points and control points. To accomplish this function addressing schemes are commonly employed. These addressing schemes requires decoding addresses supplied by the microprocessor in order to operate each one of these sense and control points.

Verifying the integrity of the operation of these control and sense points is essential to the efficient operation of a modern telecommunications system.

The GTD-5-EAX, which employs the present invention, utilizes a unique bussing arrangement for communicating with these control points and sense points. Diagnosing faults in a bussing arrangement is typically accomplished by repeated access to the equipment setting a particular bit and verifying that this particular bit is returned to the microprocessor. This set bit (logic 1) is placed (stepped through) each of the possible bit positions in order to verify the operation of the control points and sense points. GTD-5-EAX is a central office telecommunications product manufactured by GTE Communications Systems Incorporated.

The traditional bit stepping approach is not effective to diagnose faults in the control points and sense points of the GTD5-EAX, because of its unique bussing arrangement.

SUMMARY OF THE INVENTION

A real time processing system includes a number of sense point and control point printed wiring cards (PWCs) connected between a processor and external devices. The processor accesses the PWCs via an addressing arrangement. The processor transfers data to and from the printed wiring cards via a data bus to control the external devices.

The diagnostic method for validating the integrity of the addressing arrangement selects a particular address which has at least two components, corresponding to a PWC. Next, the diagnostic method tests the PWC, represented by a particular address, by writing a predefined data word to it. The word is then read back by the processor and compared with the predefined data. If it compares, the PWC's addressing is valid and the next PWC is validated. If a miscomparison exists, the addressing is faulty and an invalid condition exists.

For an invalid condition, the diagnostic method then selects a new address with one address component the same as the previous test and the other component incremented by one. This address corresponds to a second PWC with one address component identical to the previous PWC. This PWC is tested by writing the predefined data word and reading it back. If data word does not compare with the predefined word, an indication is made that the first component of the address is faulty. If the second test provides a comparison, then a fault will be indicated for the PWC and the second address component.

The above procedure is iterated for each first and second address components, incrementing each component by one, until all addresses have been validated.

DESCRIPTION OF THE PREFERRED EMBODIMENT

Figure 1:
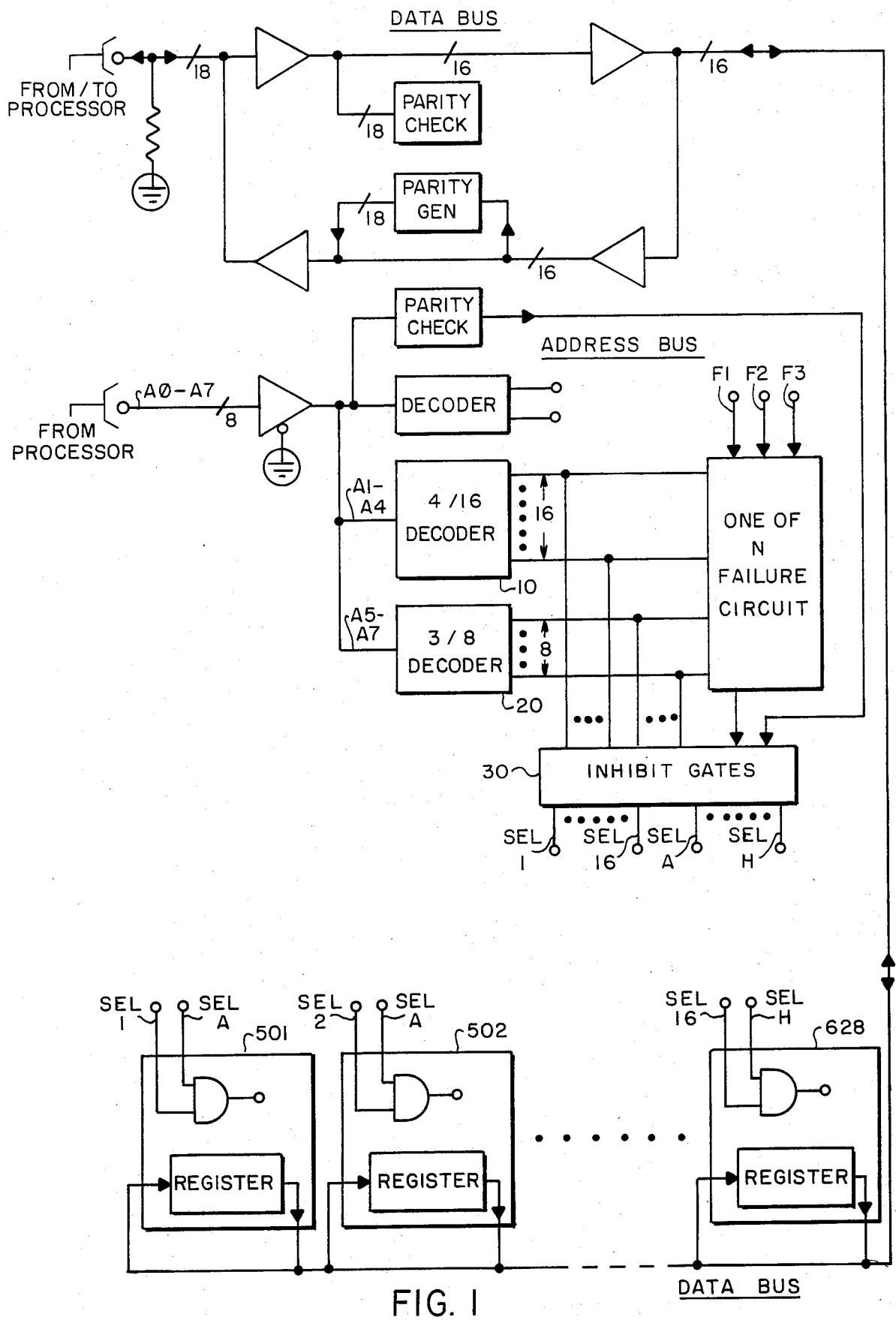
FIG. 1 is a schematic diagram of the bus structure connecting a CPU to a number of sense and control point printed wiring cards.

Referring to FIG. 1, a data bus and a address bus are shown connected between a processor and a number of printed wiring cards (PWCS) 501 through 628 which each contained a number of sense points and control points. These sense points and control points operate external circuitry such as special test circuits for line circuits and trunk circuits. The processor may comprise a microprocessor, such as an Intel 8086. Intel is a registered trademark of the Intel Corporation.

The data bus is 16 bits wide and contains 2 parity bits which are transmitted between the processor and the control point and sense point printed wiring cards 501 through 628. Parity is checked on data transmissions from the processor; and, parity is generated by this circuitry on data transmissions to the processor.

Eight bits of the address bus are used by the decoding circuitry to derive enable signals to enable specific ones of the printed wiring cards. Address bit A0 is used to derive control signals. Address bits A1 thru A4 are input to decoder 10. Decoder 10 produces numerical selects SEL1 thru SEL16. Address bits A5 thru A7 are input to decoder 20 which produces alphabetic selects SELA thru SELH.

Each of the numeric and alphabetic selects are gated through inhibit gates 30. Inhibit gates 30 may be activated to prevent transmission of any of the selects signals to the printed wiring cards. Transmission of the select signals may be inhibited, if a parity error is detected. In addition, a one of N check is performed on the decoded alphabetic and numeric selects to ensure that only one signal is decoded and that at least one is decoded. Should either of these tests fail inhibit gates 30 are activated, thereby blocking the select signals from the PWC's. Further, the one of N failure may be set for external testing purposes.

The alphabetic and numerics selects signals are connected in the following fashion to each of the printed wiring cards which contain the control points and sense points. Each printed wiring card has one alphabetic and one numeric select, which enable the operation of that particular printed wiring card. Each printed wiring card 501 through 628 contains an AND gate, which when activated enables the control point or sense point logic on the printed wiring card. Each printed wiring card further contains a register which is connected via the bidirectional data bus to the processor. This register provides for storing and controlling the control points and the sense points associated with each PWC. A logic one set in the register in a bit position corresponding to a control point will activate that control point. Similarly a logic zero inhibition bit position connected to a control point will deactivate that control point. Sense points from the external test, line and trunk circuitry are mapped into corresponding bit positions in the register and indicate that a particular function and activated or deactivated with logic 1 and logic 0 indications, respectively.

In this way, the processor can operate the special test circuits for the line and trunk circuitry by manipulating the control points and can sense the status of the line and trunk circuitry by reading the sense points.

Each printed wiring card is enabled by one alphabetic and numeric select. Printed wiring card 501 is enabled by alphabetic select SELA and numeric select SEL1; printed wiring card 502 is enabled by alphabetic select SELA and numeric select SEL2. Printed wiring card 628 is enabled by alphabetic select SELH and numeric SEL16. In this way, the control points and sense points may be operated and read by the processor to determine the status of the line and trunk circuits and to operate test circuits for the line and trunk circuits.

In order to diagnose faults in the select and bussing arrangements, two kinds of tests are required to be made. First, it must be determined whether each printed wiring card is permanently inactive. That is, each printed wiring card must respond when the appropriate alphabetic and numeric selects are supplied. Second, it must be determined that only the printed wiring card which was selected responds, when given the particular alphabetic and numeric select signals. Failures may occur in the decoding logic, in the backplane wiring the bussing, which connects the decoding logic to the printed wiring cards, or the AND gate located on every PWC, which enable the circuiting of the PWC.

Figure 2:
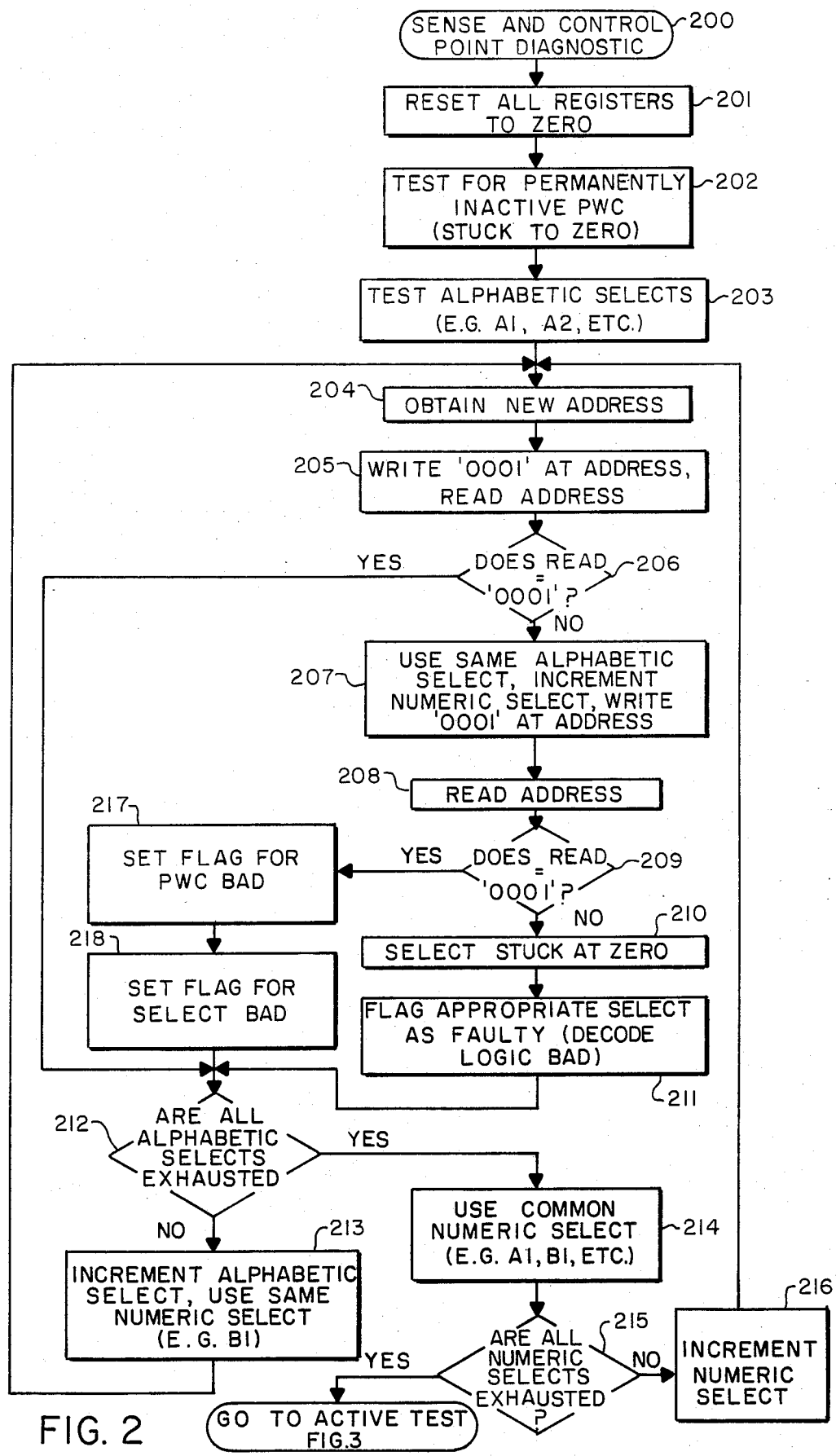
FIG. 2 is a logic diagram of the sense and control point diagnostic program.

Referring to FIG. 2, the sense and control point diagnostic 200 is entered. The register of each printed wiring card 501 through 628 is reset to zero block 201. The test for the inactive PWC is initiated block 202. The addressing is checked for any decodes which are stuck to 0. First the alphabetic selects are tested 203. Selects A1, A2, A3, B1, B2, B3, etc are checked first 203. A new address is obtained for use by the decoding logic 204. A logic '0001' is written at the address that was obtained. This address is then read back 205.

If the data which was read back is equal to logic '0001' 206, block 212 is executed next. If the data read back did not equal logic '0001' block 207 will retain the same alphabetic select but increment the numeric select and write logic '0001' at that address. This address will then be read 208. If the data read equals logic '0001', then transfer will be made to block 217. If the data read back did not equal logic '0001', then the common select is stuck at 0, block 210. Next, a flag will be set which will indicate this particular select as faulty 211.

Then, block 212 is entered, which determines whether all the alphabetic selects have been exhausted. If all the alphabetic selects have not been tested, block 213 will increment the alphabetic select and use the first numeric select. For example, if select A1 was being tested, control is then transferred to block 204 for another iteration. If all the alphabetic selects have been exhausted, block 214 is entered. Block 214 will test the numeric selects by using common alphabetic selects. If all the numeric selects are verified, block 215 is answered positively, the inactive test (stuck to 0) is complete and control is passed to the active test shown in FIG. 3. If all numeric selects have not been tested, then block 216 will increment the numeric select and transfer to block 204 to iterate the above process.

These diagnostics are continuously repeated, so the flags, that are kept in a software table, are constantly updated. When block 217 is entered, a flag will be set for a bad PWC, if on the last iteration on the diagnostic this address was also permanently inactive. If this last address, for example A2, had passed the test, before select one will be indicated as bad, that is, permanently inactive. For both blocks 217 and 218, the appropriate flag is set, so that during the next iteration where select 1 is being tested, it may fail with different alphabetic selects, such as A and B. If both A1 and B1 fail, then, due to previous flags being set, A1 failed and therefore select 1 is bad. If only A1 failed and B1 passed, therefore, PWC 501, with an address of A1, is bad. If a PWC has its selects pass the test, the corresponding bits in the table are reset.

Figure 3A:
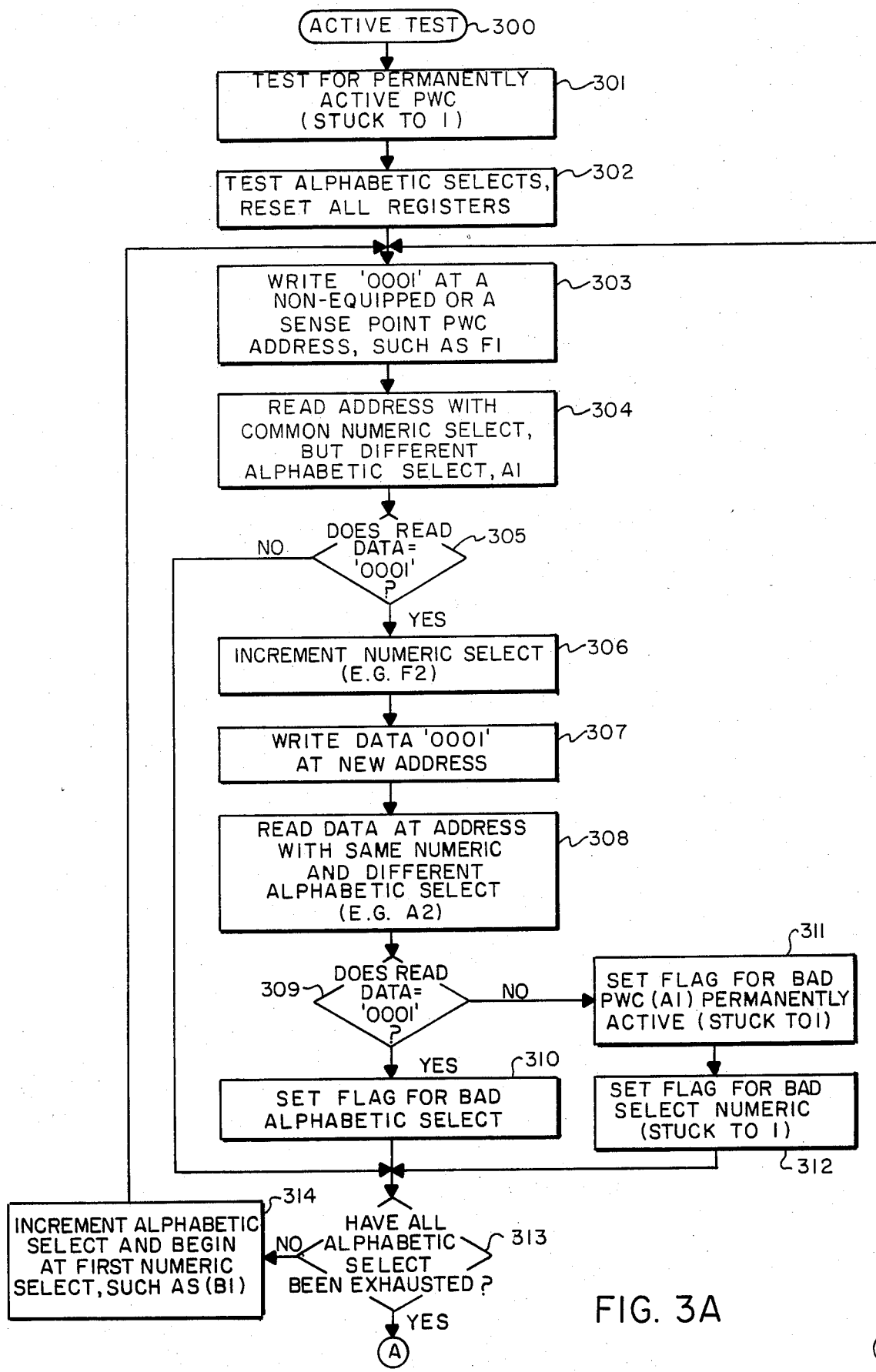
FIGS. 3A and 3B are a logic diagrams of the active testing program of the present invention.
Figure 3B:
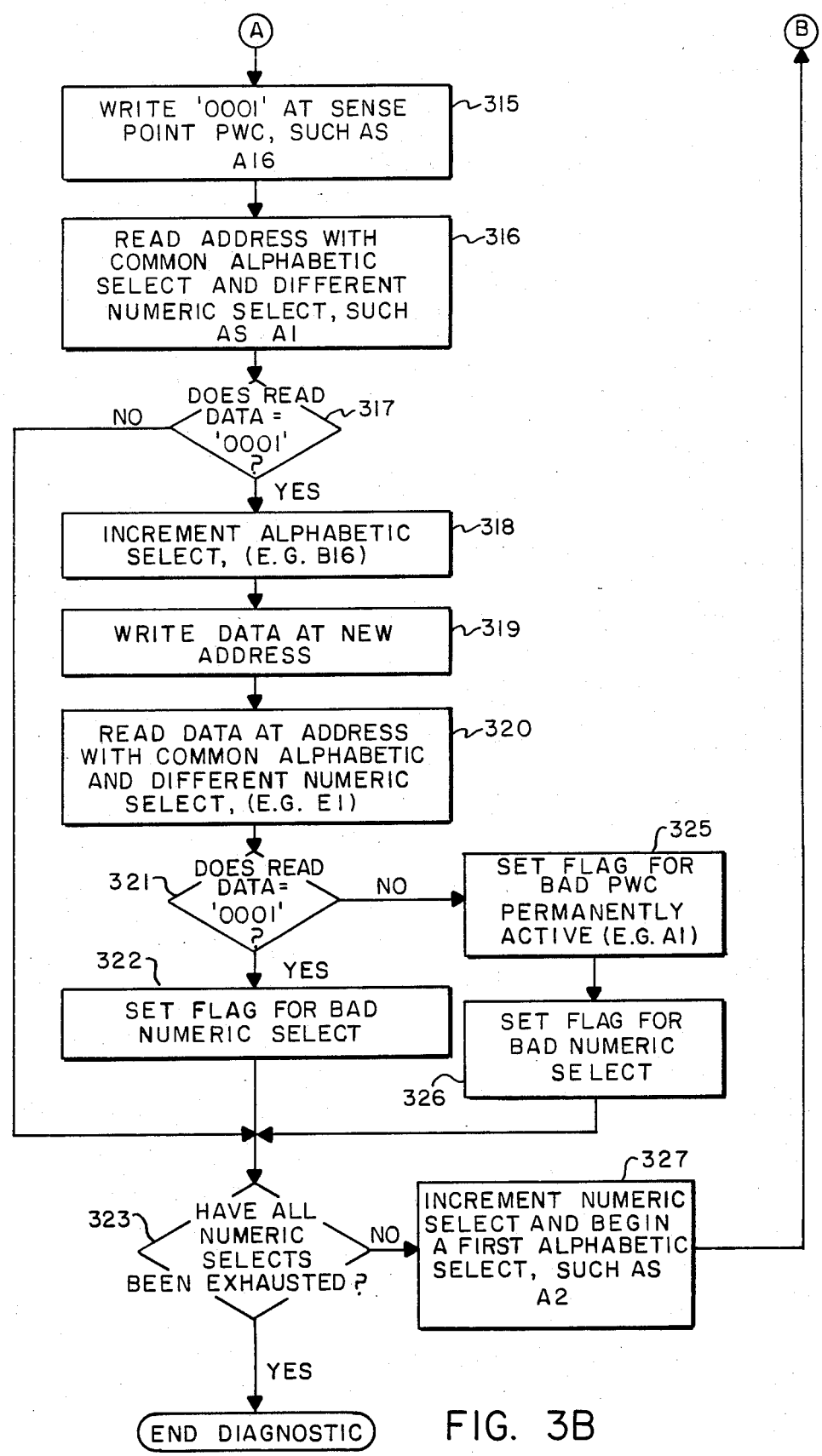

Referring to FIG. 3, when the inactive test has been completed, the active test is initiated 300. This test determines whether printed wiring cards or select signals are permanently active, that is stuck to one, block 301. First, the alphabetic selects are tested. All the registers are reset to 0, 302. The program then writes a logic '0001' at a non-equipped address or at an address which corresponds to a sense point printed wiring card (PWC). A sense point PWC contains read only elements connected to the register and, therefore, cannot be written into by the processor.

An address, such as F1, is selected to be written into with the '0001' pattern. Next, the diagnostic performs a read at an address with a common numeric select, but a different alphabetic select, such as address A1, block 304. The read data is compared the determine whether it is equal to the transmitted data '0001', 305. If the data read is not equal to the test pattern, a transfer is made to block 313. The value of the numeric select is incremented by 1. This will give a new address of F2, for example, 306.

Block 307 then writes the test pattern '0001' at this new address. The data is then read from an address with the same numeric but, a different alphabetic select, such as A2, block 308. The diagnostic then determines whether the data read is equal to the '0001' pattern, block 309. If the data is equal to the test pattern, a flag is set for a bad alphabetic select, block 310. If the data read did not equal the '0001' pattern, then either there is a bad PWC, such as 501, permanently stuck to one; or, select one is stuck permanently active. Both flags are set, so that during an iteration of the process, select 1 is tested for a permanently active condition with different alphabetic selects such as A, B, C, etc for a fault. If, for example, both A1 and B1 fail, due to flags set in previous iterations of the test, select 1 is faulty. If the PWC addressed by A1 failed but, the PWC addressed by B1 passed the test then the PWC addressed by A1 is faulty. This is accomplished by blocks 311 and 312. Block 313 determines whether all alphabetic selects have been tested. If all alphabetic selects have not been tested, the alphabetic selects are incremented by one and the numeric selects begin again at 1, block 314. Control is then transferred to iterate the above process at block 303.

When all the alphabetic select have been exhausted, the test pattern '0001' is again written to a sense point PWC, such as A16, block 315. Then, block 316 reads another address with a common alphabetic select and a different numeric select, such as, address A1. Block 317 determines whether the data read is equal to the pattern. If the data read back does not equal the pattern, control is transferred to block 323. If the data read does equal pattern, block 318 increments the alphabetic select to B16, for example.

The '0001' pattern is then written at this new address block 319. Next, block 320 reads the data at an address with a common alphabetic and a different numeric select for example, B1. Block 321 determines whether data read is equal to the pattern. If this test is affirmative, a flag is set for a faulty numeric select block 322 and control is transferred to block 323. If the data read does not equal the pattern, block 325 sets a flag for a faulty PWC permanently active, for example A1. Then, block 326 sets a flag for a faulty numeric select and transfers control to block 323. Block 323 determines whether all the numeric selects have been tested. If the tests of the numeric selects have not been completed, block 327 increments the numeric select and begins at the first alphabetic select, such as A2. Then control is transferred to iterate the above procedure beginning at block 303. If all the numeric selects have been exhausted, then block 324 is entered which terminates the diagnostic. Control is returned from the diagnostic to the calling program. This diagnostic is periodically given control to execute and to build a data table indicating whether PWC's or selects (decodes) are faulty.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a processing system including a processor, a plurality of printed wiring cards (PWCs) having a plurality of sense points or control points, an addressing arrangement for selectively enabling said PWCs and a data bus connecting said processor to each said PWC, a diagnostic method for validating the integrity of said addressing arrangement comprising the steps of:
   first selecting a first address having first and second components corresponding to a first particular PWC to be validated;
   first testing said first address with a predefined data word to produce a first valid or an invalid condition;
   second selecting a second address in response to an invalid condition of said first testing, said second address having the same first component and a second component which is incremented, said second address corresponding to a second PWC;
   second testing said second address with said predefined data word to produce a second valid or an invalid condition;
   first indicating a fault of said first address component in response to said second invalid condition;
   second indicating a fault of said second PWC and of said second address component for said first invalid condition and said second valid condition;
   first iterating said steps of first and second testing, first and second selecting and first and second indicating with an address having said first component incremented by one for each said step of first iterating for each said first address component and;
   second iterating said step of first iterating with an address having said second component incremented by one for each said step of second iterating for each said second address component.

2. A diagnostic method as claimed in claim 1, wherein there is further included the step of initializing each of said plurality of PWCs.

3. A diagnostic method as claimed in claim 2, said step of first selecting comprising the steps of:
   obtaining said first address corresponding to a first particular PWC; and
   writing said predefined data word to said particular PWC via said data bus.

4. A diagnostic method as claimed in claim 3, said step of first testing comprising the steps of:
   reading a data word from said particular PWC via said data bus; and
   comparing said data word read from said PWC with said predefined data word to produce said first valid condition for a comparison of said predefined data word with said read data word or to produce said first invalid condition for a miscomparison of said predefined data word with said read data word.

5. A diagnostic method as claimed in claim 4, said step of second selecting comprising the steps of:
   obtaining said first address corresponding to said first particular PWC and;
   incrementing said second address component of said first address by one to obtain said second address; and
   writing said predefined data word to said PWC corresponding to said second address.

6. A diagnostic method as claimed in claim 5, said step of second testing comprising the steps of:
   reading a data word from said PWC corresponding to said second address via said data bus and;
   comparing said data word read from said second addressed PWC with said predefined data word to produce said second valid condition for a comparison of said predefined data word with read data word or to produce said second invalid condition for a non-comparison of said predefined data word with said read data word.

7. A diagnostic method as claimed in claim 6, said step of first indicating including the step of setting a bit in a table corresponding to said first address component as being faulty.

8. A diagnostic method as claimed in claim 7, said step of second indicating comprising the steps of:
   setting a bit in said table corresponding to said first particular PWC as being faulty; and
   setting a bit in said table corresponding to second address component of said first particular PWC as being faulty.

9. A diagnostic method as claimed in claim 8, said step of first iterating comprising the steps of:
   determining whether all PWCs with said first address component have been diagnosed and producing a first complete or a first incomplete condition;
   incrementing said first address component in response to said first incomplete condition; and repeating said steps of claims 2 through 8 until said first
complete condition is obtained.

10. A diagnostic method as claimed in claim 9, said step of second iterating comprising the steps of:
   determining whether all PWCs with said second address component have been diagnosed and producing a second complete or a second incomplete condition in response to said first complete condition;
   incrementing said second address component in response to said second incomplete condition; and
   repeating said steps of claims 2 through 10 until said second complete condition is obtained.

11. A diagnostic method as claimed in claim 10, wherein there is included the step of terminating said diagnostic method in response to said second complete condition.

12. A diagnostic method as claimed in claim 11, wherein there is further included the step of resetting said bit in said table corresponding to said PWC in response to said first and second valid conditions.

* * * * *